April 15, 1941.  W. K. BERTHOLD ET AL  2,238,803
PASTE MOLD MACHINE FOR AND METHOD OF FORMING NARROW NECK GLASS ARTICLES
Filed March 4, 1938  4 Sheets-Sheet 1
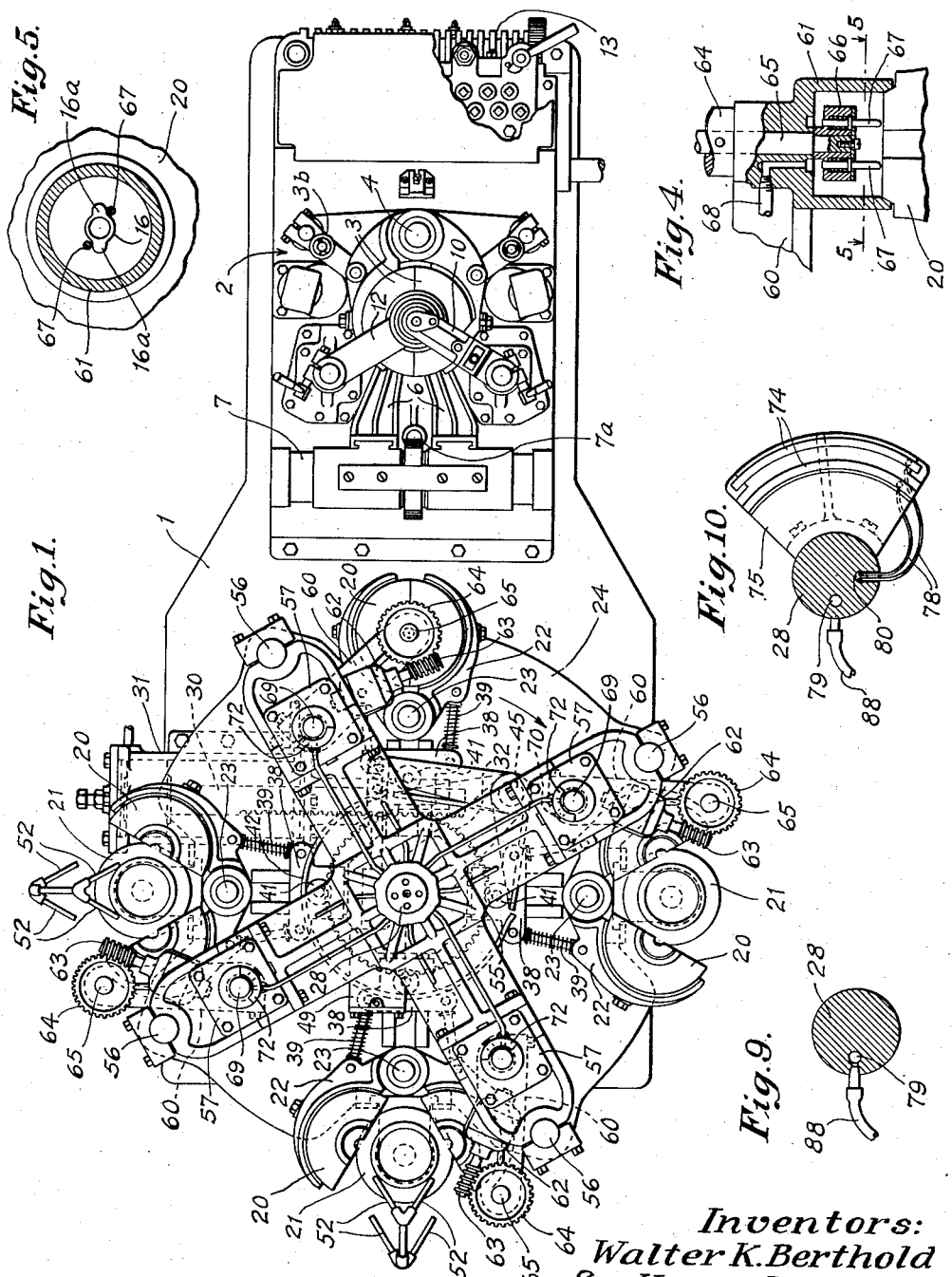
Witness:
A. A. Horn
Inventors:
Walter K. Berthold
and Henry W. Ingle
by Brown & Parham
Attorneys.

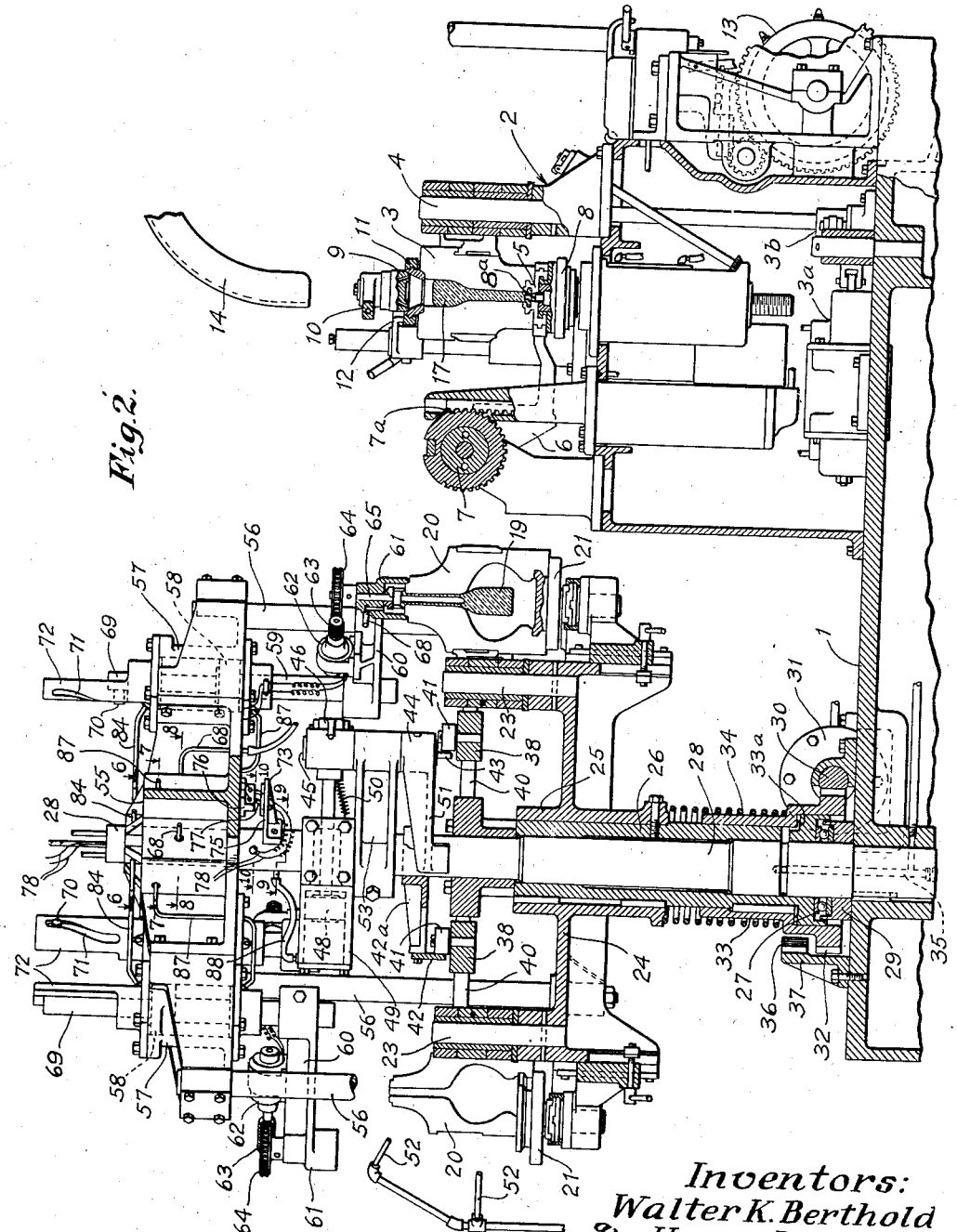

April 15, 1941.   W. K. BERTHOLD ET AL   2,238,803
PASTE MOLD MACHINE FOR AND METHOD OF FORMING NARROW NECK GLASS ARTICLES
Filed March 4, 1938   4 Sheets-Sheet 3
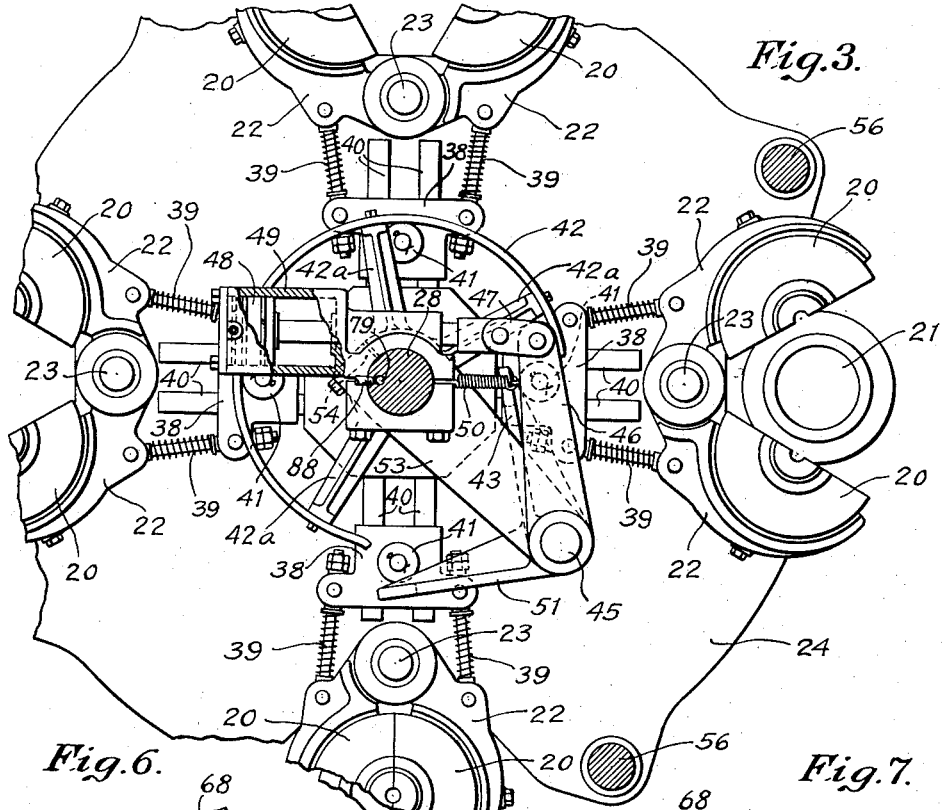
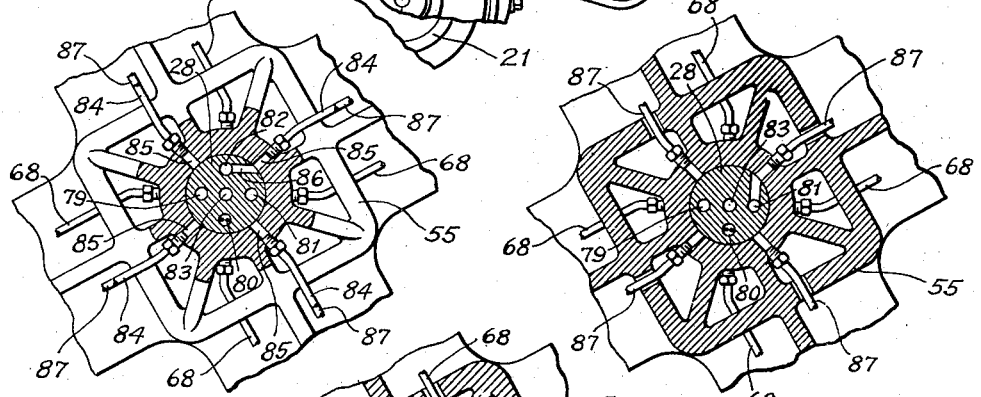
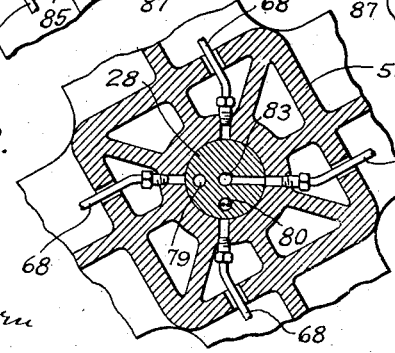
Inventors:
Walter K. Berthold
and Henry W. Ingle
by Brown + Parham
Attorneys.

April 15, 1941.   W. K. BERTHOLD ET AL   2,238,803
PASTE MOLD MACHINE FOR AND METHOD OF FORMING NARROW NECK GLASS ARTICLES
Filed March 4, 1938   4 Sheets-Sheet 4
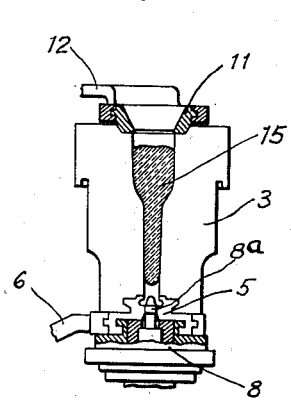
Fig.11.
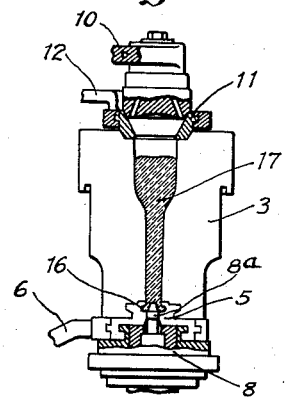
Fig.12.
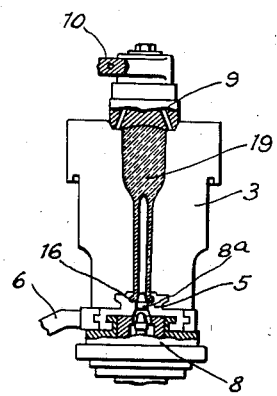
Fig.13.
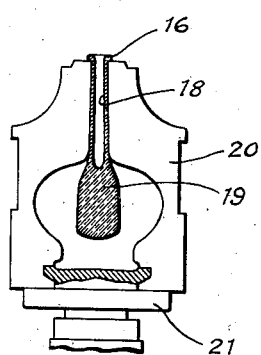
Fig.14.
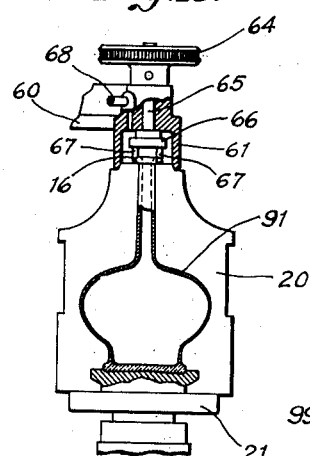
Fig.15.
Fig.16.
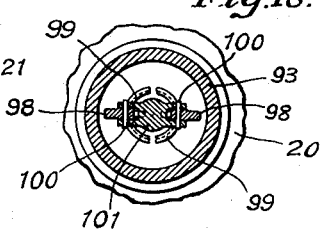
Fig.18.
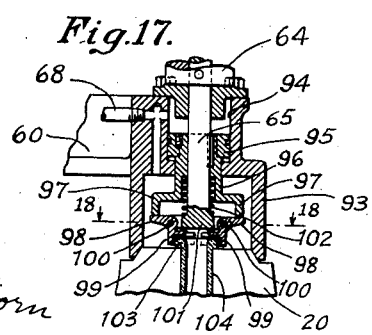
Fig.17.
Witness:
A. A. Horn
Inventors:
Walter K. Berthold
and Henry W. Ingle
by Brown & Parham
Attorneys.

Patented Apr. 15, 1941

2,238,803

UNITED STATES PATENT OFFICE 2,238,803

PASTE MOLD MACHINE FOR AND METHOD OF FORMING NARROW NECK GLASS ARTICLES

Walter K. Berthold, Rockville, and Henry W. Ingle, Windsor, Conn., assignors to Hartford-Empire Company, Hartford, Conn., a corporation of Delaware Application March 4, 1938, Serial No. 193,882

9 Claims. (Cl. 49—9)

This invention relates to the manufacture of hollow glass articles.

An object of the invention is to provide for the manufacture of narrow neck articles of glassware by the use of a paste mold machine and by a method that employs a paste mold or paste molds.

A further object is to provide a practical and efficient glassware forming machine for and a method of forming molten glass charges into hollow glass articles in accordance with the usual narrow neck method of forming such articles, except that the hollow glass blanks or parisons which have been formed according to that method subsequently are rotated about their own axes in paste molds in which such blanks or parisons are blown in final form.

A further object of the invention is to provide in a glassware forming machine of the character described a novel mechanism for rotating hollow glass blanks or parisons in paste molds during the blowing of such blanks or parisons to final form.

Further objects and advantages of the invention will hereinafter be pointed out or will become apparent from the following description of a glassware forming machine embodying structural features of the invention and of typical steps of a method of carrying out the invention, as illustrated in the accompanying drawings, in which Figure 1 is a plan view of a glassware forming machine constructed according to the present invention, details which are not necessary for an understanding of the invention being omitted;

Fig. 2 is a view partly in longitudinal vertical section and partly in side elevation of the glassware forming machine referred to;

Fig. 3 is a plan sectional view through a portion of the machine, showing paste mold units which are included therein together with mechanism for opening and closing the molds of such units;

Fig. 4 is a fragmentary view, mainly in vertical section of a combined blow head and parison rotating mechanism that is included in our forming machine as shown in the preceding views;

Fig. 5 is a fragmentary horizontal section through the blow head, on line 5—5 of Fig. 4, showing parison neck engaging elements of the parison rotating mechanism in position to effect rotation of a parison in an underneath paste mold;

Fig. 6 is a section along the line 6—6 of Fig. 2, showing particularly means for controlling application of air from the stationary central shaft or column of the machine to parts which rotate about the axis of that shaft or column;

Figs. 7 and 8 are views similar to Fig. 6, but at planes indicated by the section lines 7—7 and 8—8, respectively, on Fig. 2;

Fig. 9 is a section at a still lower level, along the line indicated 9—9 of Fig. 2, showing one of the air lines of the machine;

Fig. 10 is a section along the line 10—10 of Fig. 2, showing the air line of Fig. 9 and also a portion of an electric switch that is included in the machine;

Figs. 11 to 15 inclusive are fragmentary vertical sectional views illustrating various steps in the manufacture of a hollow article of glassware according to our novel method;

Fig. 16 is a vertical section through the finished article of glassware that has been produced by the method partially illustrated in Figs. 11 to 15 inclusive;

Fig. 17 is a view similar to Fig. 4 but showing a combined blow head and parison rotating mechanism having means for engaging and rotating a parison having a circular bead or portion at the extremity of its neck, and Fig. 18 is a fragmentary horizontal sectional view on line 18—18 of Fig. 17, showing the engagement of the neck gripping means of the mechanism shown in Fig. 17, with the neck of the parison in the underneath mold.

According to the present invention, charges of molten glass are formed into hollow blanks or parisons by steps such as are ordinarily employed in the narrow neck process of forming bottles or other narrow neck glass articles. These hollow blanks or parisons may have relatively narrow neck portions which, in some instances, also may be relatively long.

Each such hollow blank or parison is transferred to an upright paste mold in which the hollow blank or parison is blown to final form while being rotated in the paste mold. Provision is made to assure adequate cooling or setting of the neck portion of the hollow blank or parison by the time the rotation thereof in the paste mold is commenced and while the glass of the body of such parison is in suitable condition for the expansion necessary to give it the final shape desired. Suitable novel mechanism is provided for engaging the neck end portion of the hollow blank or parison while it is in the blow mold and for rotating such blank or parison during the blowing thereof in the blow mold. A narrow neck glass article having a long narrow neck may thus be formed in a paste mold as one integral whole or unit.

The glassware forming machine shown in the drawings may comprise a supporting base or platform 1 (Figs. 1 and 2). Mounted on one end portion of this base or platform is a hollow blank or parison forming and transfer mechanism generally designated 2, which may comprise component operating and structural parts substantially as included in the well-known Hartford I. S. forming machine. Thus, the mechanism 2 comprises an inverted blank or parison body mold 3, consisting of sections pivotally supported on an upright shaft 4 and arranged to be opened and closed at predetermined appropriate intervals, as by the power device 3a, Fig. 2, and its connections with the body mold sections shown in Figs. 1 and 2 and generally designated 3b.

Beneath the blank or parison body mold 3 is a cooperative neck ring 5, Fig. 2, which also consists of cooperative sections mounted on arms 6 which are pivotally supported on the horizontal shaft 7, Figs. 1 and 2. A suitable combined counter-blow head and neck pin mounting 8, Fig. 2, is disposed beneath the neck ring 5 in position to cooperate with the latter. A combined settle blow head and bottom plate 9 is mounted on a swingable arm 10, so that it may be swung to and from one operative position on a funnel 11, as shown in Figs. 2 and 12. When the funnel 11 has been removed, the member 9 may be moved to and from a second operative position, shown in Fig. 13, on top of the blank or parison body mold. The funnel 11 is supported and operated by an arm 12.

The operations of these parts and the mechanisms and connections for effecting such operations preferably are the same as those of the Hartford I. S. machine. Such operations are timed and controlled by a Hartford I. S. timer, indicated at 13, Figs. 1 and 2, although of course any other suitable known operating and timing mechanisms may be employed in lieu thereof.

The operation of the structure that has been described so far in the formation of a hollow glass blank or parison may be substantially as follows:

A charge of glass from a suitable feeder or feeding instrumentality (not shown) may be conducted, as through the curved chute 14, Fig. 2, and the funnel 11 to the cavity of the closed inverted blank or parison mold. The charge of glass in the inverted blank or parison mold at this stage of the proceedings may be as indicated at 15 in Fig. 11. The combined settle blow head and bottom plate 9 then is brought to its operative position on the funnel 11, shown in Figs. 2 and 12, and settle blowing air may be applied therethrough to compact the glass charge in the inverted mold. This will force a portion of such glass downwardly around the neck pin 8a to form a neck finish or beaded end portion 16 on the neck of the otherwise solid glass blank 17, substantially as illustrated in Figs. 2 and 12. The particular cavity of the neck ring may be of suitable shape to produce oppositely extending lugs 16a, best seen in Fig. 5, on the neck finish or beaded end portion of the glass blank.

The funnel 11 then is removed from the top of the inverted blank or parison mold and the combined settle blow head and bottom plate is lowered to operative position directly on such mold, as shown in Fig. 13. Counterblowing air is applied through the head 8 to the space vacated by the then retracted neck pin to form a so-called "bubble" or internal cavity 18 in the glass in the mold. This glass now constitutes a hollow blank or parison designated 19, shown as having a relatively long narrow neck portion.

After removal of the combined settle blow head and bottom plate from the inverted mold and opening of the halves of the blank or parison body mold, the arms 6, carrying the closed neck ring which supports the hollow glass blank or parison, will be actuated to swing the neck ring and the hollow glass blank or parison through approximately 180° to position the then upright blank or parison between the halves of a cooperative paste mold at an adjacent transfer station. The swinging of the arms 6 may be effected by a suitable rack and pinion device, indicated at 7a, Figs. 1 and 2. This device is included in the usual Hartford I. S. parison forming and transfer mechanism.

Mechanism for completing the formation of the articles of glassware desired will now be described. Such mechanism includes one or more blow mold units, each comprising a pair of cooperative partible halves or sections 20 and a bottom plate 21, shown to advantage in Figs. 2, 14 and 15. The halves 20 of each blow mold unit may be pivotally supported by suitable arms 22 (see Fig. 3) on an upright stud or shaft 23 which is carried by a rotary carrier 24. The latter may be a table having a hub 25. The hub 25 of the carrier 24 is mounted on a sleeve 26 which is supported anti-frictionally at its lower end, as at 27, for rotary movement about a main central shaft 28. As shown, the hub is secured to the sleeve 26 to rotate with the latter, and the bearing structure at 27 includes a thrust or bottom supporting member 29 which surrounds the shaft 28 and rests upon the base 1. The lower portion of the shaft 28 is secured in an embossed or socketed portion of the base.

The carrier 24 carries a plurality (four in the example shown) of the blow mold units, which are spaced equally around the periphery of the carrier.

The rotation of the carrier is intermittent in character, so as to bring each of the blow mold units in turn to the position occupied by the right-hand blow mold unit in Fig. 2. The movement of the carrier is clockwise as viewed in Fig. 1 as indicated by the arrow in that view. The carrier rotating mechanism may comprise a reciprocable rack 30 operated by a suitable power device, such as the piston and cylinder indicated at 31, and a gear 32 cooperative with the rack bar 30 and integral with a vertically movable sleeve 33 which is feathered to the sleeve 26 (see Fig. 2). A spring 34 tends to maintain the sleeve 33 in its lower position, so that the teeth of the gear 32 are in mesh with the rack bar 30. However, air from a supply line 35 is applied periodically beneath the annular shoulder 33a of the sleeve 33 to force the latter upward against the spring 34 until the teeth of the gear 32 no longer mesh with the rack bar 30 but instead mesh with teeth 36 at the inner side of an arcuate stationary latch bar or retaining member 37. During the time the sleeve 33 is in its upper position, it will be maintained stationary, as will the rotary carrier 24 which is connected therewith through the intermediacy of the sleeve 26 and hub 25. While this occurs, the rack bar 30 will be returned to its retracted position for further engagement with the gear 32 when the sleeve 33 has been returned to its lower position. The next stroke of the rack bar 30 will then rotate the carrier 24 one-quarter of a complete revolution, so as to bring the succeeding blow mold unit to the transfer station hereinbefore referred to. Of course, each of the other blow mold units likewise will be advanced one station by the intermittent rotary movement of the carrier.

The arms 22 of the halves of each blow mold, pivoted as aforesaid on a supporting post or stud 23, may be actuated so as to close each blow mold in its turn about an upright hollow glass blank or parison 19 at the transfer station and to cause opening of the blow mold at the next or take-out station (see Figs. 1 and 3) for the removal of the article which in the meantime has been blown to final form.

The mold opening and closing mechanism comprises cross heads 38, mounted on the carrier 24, for radial movements and connected pivotally with the arms 22 by suitable connecting or link mechanisms 39. The arrangement is such that when a head 38 moves radially on its slideway 40 on the carrier 24 from projected position toward the axis of rotation of the carrier, the halves of the associate blow mold will be opened. Reverse radial movement of a head 38 will cause closing movements of the halves of such blow mold.

Each of the heads 38 is provided with a roller 41. An arcuate retaining bar 42 concentric with the axis of rotation of the carrier 24 and extending for the major part of a full circle is supported above the carrier 24 as by arms 42a on the main supporting shaft, in position to engage at its inner surface with the rollers 41, to maintain the blow molds open throughout the greater part of their travel around the axis of the carrier 24. As each blow mold unit is brought by an intermittent rotary movement of the carrier 24 to the transfer position previously identified, its roller 41 will be moved beyond one end of the arcuate bar 42 and against the outer surface of a rocker arm 43 having a hub 44 which is secured to a vertically disposed rock shaft 45. A power receiving or actuating arm 46 on this rock shaft 45 is connected by linkage 47, Fig. 3, with a piston 48 in a cylinder 49.

Air is applied to the cylinder 49 to close the halves of the blow mold shown at the transfer station in Fig. 3, the movement of the rocker arm 43 then camming the roller 41 on the cross head 38 of the associate blow mold unit radially outward against the action of a retractile spring 50. At the same time another rocker arm 51 on the same hub 44 will be swung inwardly against the roller 41 on the cross head 38 of the blow mold unit at the take-out station. This will open the latter blow mold and will dispose the roller 41 of the cross head of such blow mold in position to enter the arcuate bar 42 on the next intermittent rotary movement of the carrier. The blow molds will be kept open during their movements to and from the next two stations for cooling which may be accelerated by spray from cooling nozzles such as those indicated at 52 in Fig. 2.

As best seen in Fig. 2, the power-applying rocker arms 43 and 51 on the hub 44 have pendant lugs or portions at their ends for engaging the rollers 41 of the respective blow molds at the times and places pointed out above without interfering with movements of such rollers in generally circular paths at other times. The rock shaft 45 is journaled in a bearing portion of a bracket 53 which is clamped on the main upright shaft 28. The cylinder 48 likewise may be carried by a clamp 54 secured to the same shaft, as shown in Fig. 3.

It, of course, will be understood that each open blow mold, on arrival at the transfer station, is closed at the proper time to surround and subsequently support the hollow blank or parison 19 that has been brought to that transfer station by the transfer mechanism previously described.

The transfer station also constitutes the blowing station. The mechanism for blowing the hollow blank or parison to final form in the blow mold at this station and for rotating such blank or parison will now be described.

An upper table or turret 55 is rotatably mounted on the upper end portion of the shaft 28, being supported on standards or posts 56 on the lower carrier 24 for rotation with the latter. This upper table or turret carries spaced blowing and blank or parison rotating units for the respective blow molds. Each of such units comprises a vertically disposed cylinder 57 in which there is a reciprocable vertical piston 58. A piston stem 59 depends from the cylinder above the carrier 24 inwardly of and at one side of the corresponding blow mold unit. An arm 60 is carried by this piston stem 59 and supports at its outer end a blow head 61 adapted to rest on the closed associate blow mold at the transfer station when the arm 60 is in one of its two different positions.

A motor 62 on the arm 60 operates a worm 63 in engagement with a worm wheel 64 on the upper end of a shaft 65 which depends through the blow head 61. As best seen in Fig. 4, the lower end of the shaft 65 carries a head 66 from which depend pins 67 for engaging with the laterally extending lugs 16a on the beaded end 16 of the neck portion of the hollow blank or parison 19 in the associate blow mold. Consequently, when the motor 62 is energized, as occurs when a blow head 61 is in operative position at the transfer and blowing station shown in Fig. 2, the hollow blank or parison will be rotated about its own axis in the blow mold. This may be done without injury to the long neck of the hollow blank or parison, because this portion of the blank or parison has become set by reason of its contact with the relatively cold walls of the portion of the blow mold above the hollow body cavity thereof. The blow mold, therefore, may be a paste mold and the blank or parison may be rotated as a unit in such mold throughout the blowing operation. The air for blowing the hollow blank or parison to final form in the blow mold may be supplied to the blow head 61 by a pipe 68 (Fig. 2).

The lifting of the blow head after the blowing operation has been completed, is effected by raising the piston 58 in the cylinder 57. This operation will be attended by lateral swinging of the arm 60 from a position above the blow mold. The piston 58 is provided with an upward extension 69 carrying a lateral pin 70 working in a spiral cam slot 71 in an upstanding cam plate 72 on the cylinder 57 and co-acting therewith to produce lateral swinging movements of the arm 60 as such arm is raised and lowered.

The energization of the motor at the transfer and blowing station may be effected by the closing of a switch 73 (Fig. 2). This switch comprises a pair of spaced arcuate contact bars 74 on a switch plate 75 which may be carried by the main shaft 28 (Fig. 10). Each of the blowing and hollow blank or parison rotating units is provided with a component part of this switch in the form of a plate 76 (Fig. 2) carried by the upper intermittently rotated carrier 55, and provided with a pair of depending contact fingers 77 adapted to be brought into wiping engagement with the contact bars 74 when each blowing and blank or parison rotating unit is brought to position to cooperate with a blow mold unit at the transfer and blowing station. At other times, the rotary movement of the upper carrier will open the switch, thus described, so that the motors of the blank or parison blowing and rotating units will be deenergized while they are away from the transfer and blowing station.

Electric wires for the contact bars 74 are indicated at 78 (Figs. 2 and 10). Wires from each of the cooperative switch plates 76 lead therefrom to the associate motor 62, both of these parts being carried on the same intermittently rotated carrier.

To effect the operations just described, electrical and air connections may be employed substantially as follows: Fig. 6 shows five bores or passages, designated 79, 80, 81, 82 and 83 respectively, in the main upstanding stationary shaft 28. The bore 80 accommodates the wires 78. The remaining bores are air lines. The rotating parts surrounding the shaft 28 carry pipes or conduits cooperative with certain of these air lines for supplying air to such pneumatic or air applying mechanisms as are moved around this shaft. Thus, pipes 84 (Fig. 6) have ports such as indicated at 85 through the hub of the upper carrier 55 for registering in turn with a lateral port 86 from the air line 82 for supplying air pressure to the upper ends of the blow head cylinders 57 in turn and when each is at an appropriate place in its path of rotation.

Pipes 87 (Fig. 7) receive air from the line 81 through a similar arrangement of registering ports to supply air under pressure to the lower ends of the cylinders 57 in turn, and when each is at the proper place in its path of movement. Pipes 68, which have hereinbefore been referred to as supplying blowing air to the blow head 61, are shown in Fig. 8 and each is adapted to be supplied at the proper time with air under pressure from the air line 83.

Air is supplied to the cylinder 49 of the mechanism for opening and closing the blow molds through a pipe 88 (Figs. 2 and 9) which is connected with the air line 80.

The remainder of the operation of forming a complete narrow neck article may be substantially as follows: The transfer of the hollow blank or parison to the blow mold at the transfer station may be effected in the manner described. The neck ring by which such transfer was made will be returned to position to cooperate with the blank body mold in the formation of a further hollow blank or parison. The blow mold will support the upright hollow blank or parison by its neck portion substantially as shown in Fig. 14, thereby extracting heat from this portion of the hollow blank or parison, so that it will set or solidify sufficiently to maintain this form when the required torsional force is applied thereto to rotate the parison in the blow mold during the subsequent expansion of that parison to the final form desired.

An associate blow head 61 is lowered to the position shown in Fig. 15, the depending pins 67 engaging with the oppositely extending lugs or portions 16a of the beaded upper end of the neck of the parison, so as to rotate this parison as a unit. Air under pressure enters the hollow parison through the neck portion thereof and expands the body of the glass parison against the walls of the blow mold to form an article which may be substantially as indicated at 91 in Fig. 15. This particular article is appropriate for the formation of the upper glass member, indicated at 92 in Fig. 16, of a glass coffee maker. The article 92 is produced by cracking off the bottom and extreme top portions of the article 91 in any suitable known way.

The blow mold containing the article 91 is moved by the next rotative movement of the carrier 24 to the takeout station at which it is opened for removal of such article, which may be accomplished by the use of any suitable known mechanism or by hand.

In the event that the beaded or extreme upper end portion of the hollow narrow neck blank or parison has a circular shape or lacks oppositely extending lugs or portions as described, the means for engaging and rotating the blank or parison in the blow mold may be differently constructed. For example, we show in Figs. 17 and 18 another form of mechanism for rotating the hollow blank or parison. In such mechanism the blow head carried by the arm 60 is designated 93. Within this blow head is the shaft 65 which is rotated in the manner hereinbefore described. The upper part of this blow head is formed to constitute a cylinder 94 in which is disposed a hollow piston 95 which has a tubular stem 96 depending within the blow head, and provided with oppositely disposed lugs 97 which are located a sufficient radial distance from the axis of the shaft 65 to bear on arms 98 for actuating gripping members 99 which are pivotally supported at 100 on a head 101 at the lower end of the shaft 65. A spring 102 is located about the shaft 65 between the piston stem 96 and the head 101. When blowing air passes into the blow head, a portion of such air will enter the cylinder 94 and move the piston 95 downward, thereby closing the grippers 99 on the upper end portion 103 of the neck mold 104 of a hollow blank or parison in the underlying blow mold 20. The rotation of the shaft 65 will then rotate the hollow blank or parison in such blow mold. The grippers may be lined with asbestos or similar material, if desired, or may vary in construction as required to suit various neck finishes and service conditions. The operation is substantially the same as when the previously described form of blowing and blank or parison rotating mechanism is used.

The invention is not to be limited by the details shown herein beyond the scope of the appended claims.

We claim:

1. Glass forming apparatus comprising means for forming a charge of molten glass into a hollow blank or parison having a neck portion of substantially less external diameter than that of the body thereof, a paste mold having walls adapted to contact with and absorb heat from the neck portion of said hollow blank or parison for the full length of said neck portion and having a main cavity adapted for the reception of the body of the blank or parison, means for transferring said hollow blank or parison to the paste mold, and means for blowing the blank or parison to final form in the paste mold and for effecting relative rotary movement between the entire blank or parison as a unit and all portions of the walls of the paste mold in contact with said blank or parison.

2. Glass forming apparatus comprising means for forming a charge of molten glass into a hollow blank or parison having a neck portion of substantially less external diameter than that of the body thereof, a paste mold having walls adapted to contact with and absorb heat from the neck portion of said hollow blank or parison for the full length of said neck portion and having a main cavity adapted for the reception of the body of the blank or parison, means for transferring said hollow blank or parison to the paste mold, and means for blowing the blank or parison to final form in the paste mold and for rotating the entire blank or parison as a unit about its own axis in said paste mold relatively to all portions of the paste mold in contact with glass of said blank or parison.

3. Glass forming apparatus comprising means for forming a charge of molten glass into a hollow blank or parison having a neck portion of substantially less external diameter than that of the body thereof, a paste mold having walls adapted to contact with and absorb heat from the neck portion of said hollow blank or parison for the full length of said neck portion and having a main cavity adapted for the reception of the body of the hollow blank or parison, means for transferring said hollow blank or parison to the paste mold and a combination device for engaging the neck end portion only of the blank or parison in the paste mold for rotating the entire blank or parison as a unit about its own axis relatively to all glass contacting parts of the paste mold and for applying air under pressure to the interior of said hollow blank or parison to blow the latter to the final form desired while it is rotated in said paste mold.

4. Glass forming apparatus comprising means for forming a charge of molten glass into an inverted hollow blank or parison, said means comprising an inverted parison body mold having an open-ended cavity of relatively small diameter from its lower end for a substantial part of the length thereof and of considerably greater diameter for the remainder of the length of the inverted parison body mold, a neck ring beneath said inverted body mold and a neck pin cooperative with said neck ring to produce an initial blow aperture in the glass in the neck ring, a bottom plate on the inverted parison body mold, and means for applying air under pressure to said initial blow aperture to counterblow the glass in the parison body mold against said parison bottom plate to form a hollow blank or parison having a relatively long narrow neck portion, an upright paste mold adjacent to said hollow blank or parison forming means, means for transferring said hollow blank or parison to said paste mold and for reverting the blank or parison during said transfer, said paste mold having walls at its upper portion for contacting and absorbing heat from said long, narrow neck portion of the hollow blank or parison for substantially the full length of said neck portion, and means for engaging the upper end of the neck portion of the hollow blank or parison in the paste mold to rotate the entire blank or parison as a unit about its own axis relatively to all glass contacting portions of said paste mold and for applying air under pressure to the interior of the blank or parison to blow it to final form.

5. In a glass forming machine, a rotary carrier, a plurality of upright paste mold units on said carrier, means for intermittently rotating said carrier to bring each of said paste mold units in turn to a transfer station at which a hollow blank or parison may be delivered thereto, and a blank or parison rotating and blowing unit for each paste mold unit and mounted to rotate with its paste mold unit about the axis of said carrier, said blank or parison rotating and blowing unit comprising a hollow, open-bottomed blow head adapted for substantially air-tight contact at its bottom edge with the top portion of said paste mold unit, means for moving said blow head to and from an operative position on its paste mold unit when the latter is at said transfer station, a rotary shaft depending through said blow head and means carried by said rotary shaft within said blow head for engaging the upper end portion of a hollow blank or parison in said paste mold unit for rotating the blank or parison, and means for rotating said shaft when said blow head is in operative position on a paste mold at said transfer station.

6. In a glass forming machine, the combination with an upright paste mold of a device for rotating a hollow blank or parison about its own axis in the paste mold and for applying air under pressure to said blank or parison, said device comprising a hollow, open bottomed blow head adapted for substantially air-tight contact at its bottom edge with the top portion of said paste mold, means for moving said blow head to and from operative position on said paste mold, rotary means depending within and rotatable independently of said blow head for engaging the upper end of said hollow blank or parison to effect rotary motion of the latter about its own axis and means for rotating said rotary means.

7. The method of forming a hollow glass article, which comprises forming a charge of molten glass into a hollow blank or parison having a neck portion of less external diameter than that of the body of the blank or parison, transferring said hollow blank or parison to an upright paste mold and supporting it in said paste mold by its neck portion, extracting more heat from said neck portion than from the remainder of the thus supported blank or parison, rotating said blank or parison as a unit about its own axis in relation to all glass contacting parts of said paste mold and applying air under pressure to the interior of the blank or parison to blow it to final form in said paste mold.

8. The method of forming a hollow glass article which comprises forming a charge of molten glass into an inverted hollow blank or parison having a neck portion of less diameter than the body of the blank or parison, reverting said blank or parison and transferring it to an upright paste mold, supporting said blank or parison by its neck portion in said paste mold, extracting relatively more heat from the walls of the neck portion than from the remainder of the blank or parison, rotating the blank or parison as a unit about its own axis while it is in said paste mold and in relation to all glass contacting parts of the paste mold, and blowing the blank or parison to final form in said paste mold.

9. The method of forming an article of hollow glassware which comprises forming a charge of molten glass into a hollow blank or parison having a relatively long and narrow neck portion, differentially cooling the neck portion and the body of the hollow blank or parison to cause the glass of said neck portion to solidify sufficiently to maintain its shape under a torque sufficient to rotate the entire blank or parison about its own axis in a paste mold in relation to all glass contacting parts of the paste mold while the body of the blank or parison is still sufficiently plastic to be expanded against the walls of the paste mold by air under pressure applied through the neck portion of said blank or parison, and applying said air under pressure to said blank or parison while it is being supported by its neck portion and rotated about its own axis in said paste mold.

WALTER K. BERTHOLD.
HENRY W. INGLE.